T. L. VALERIUS.
CREAM STORING CABINET.
APPLICATION FILED FEB. 28, 1916.
1,212,586.
Patented Jan. 16, 1917.
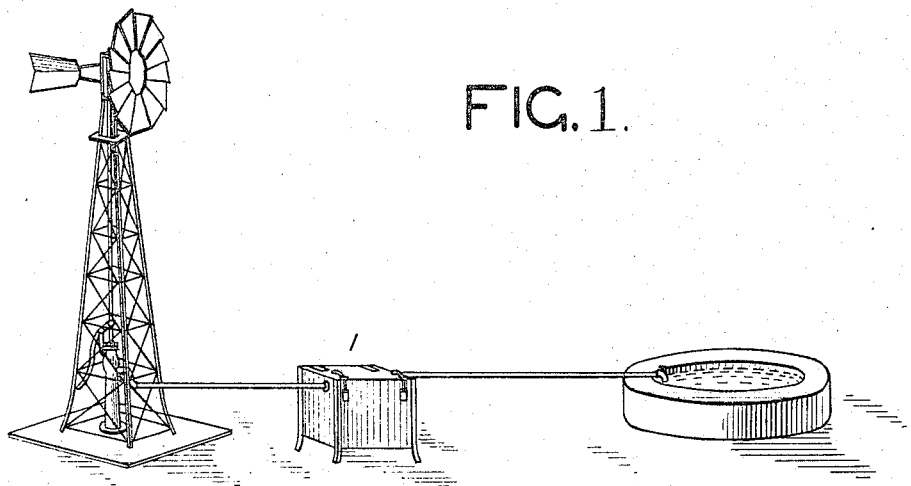
FIG. 1.
FIG. 2.
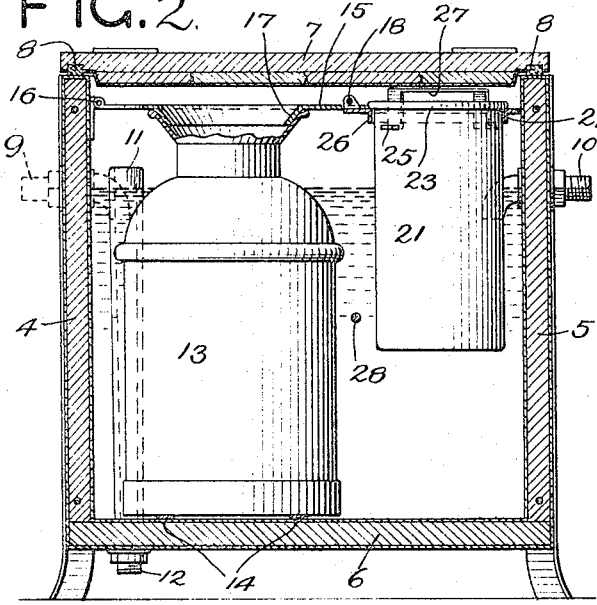
FIG. 3.
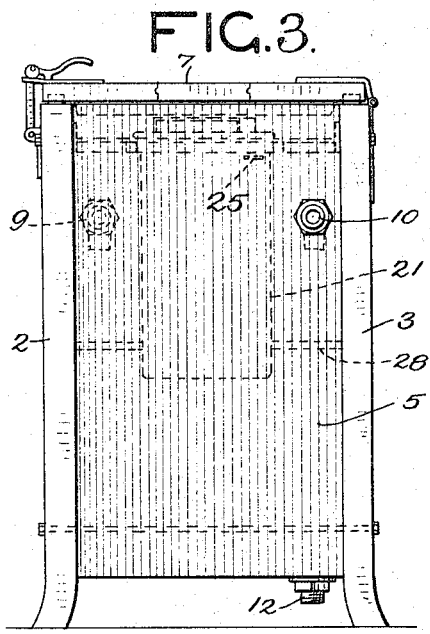
FIG. 4.
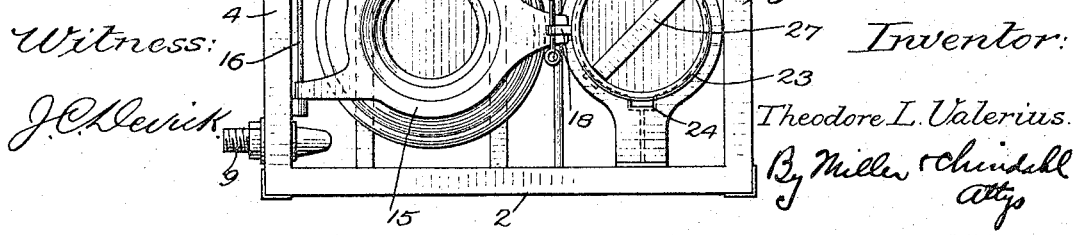
Witness:
J. C. Devick
Inventor:
Theodore L. Valerius.
By Miller & Chindahl
Attys

UNITED STATES PATENT OFFICE.

THEODORE L. VALERIUS, OF FORT ATKINSON, WISCONSIN, ASSIGNOR TO THE CREAMERY PACKAGE MANUFACTURING COMPANY, OF CHICAGO, ILLINOIS, A CORPORATION OF ILLINOIS.

CREAM-STORING CABINET.

1,212,586.  Specification of Letters Patent.  Patented Jan. 16, 1917.

Application filed February 28, 1916. Serial No. 80,788.

*To all whom it may concern:*

Be it known that I, THEODORE L. VALERIUS, a citizen of the United States, residing at Fort Atkinson, in the county of Jefferson and State of Wisconsin, have invented certain new and useful Improvements in Cream-Storing Cabinets, of which the following is a specification.

The cabinet herein disclosed is intended for use by farmers and dairymen to hold cream or milk, especially cream that is to be shipped to distant creameries, or sweet cream which is to be sent to city dairies. Heretofore it has been customary to store cream in jars, milk pans and cans placed in the farmhouse cellar. This practice is very unsatisfactory as the cream cannot be kept uniform in quality. During warm weather the cream becomes rancid and contaminated with offensive cellar odors. In winter it is liable to be frozen, such freezing causing separation of the globules of butter fat.

When warm cream taken from the cream separator is mixed with cool cream previously stored, as has heretofore been the practice, the warm cream tends to raise the temperature of the cool cream to a point where bacteria multiply rapidly, thus causing souring of all of the cream.

The object of this invention is to provide a cabinet wherein cream can be stored at a suitable temperature, the cabinet being provided with means whereby the last batch of cream may be kept separate from that previously stored, until such last batch has been thoroughly cooled.

In the accompanying drawings, Figure 1 is a perspective view illustrating one way in which the cabinet may be installed. Fig. 2 is a vertical sectional view of the cabinet. Fig. 3 is an end elevation, and Fig. 4 is a plan view of the cabinet with the cover removed.

The cabinet 1 may be of any suitable size and form adapted for the reception of the cream containers, and any suitable means may be provided for cooling the cream containers. Where a supply of cool water is obtainable, arrangements may be made for permitting a flow of water through the cabinet for the purpose of cooling the stored cream. In Fig. 1, I have shown the cabinet as arranged to receive a supply of water from a pump driven by a windmill, the water flowing from the cabinet 1 to a stock tank. It will be understood that the pump may be operated by hand or by an internal-combustion engine, if desired.

The cabinet or box 1 comprises side walls 2 and 3, end walls 4 and 5, bottom 6 and a hinged cover 7. These parts may be constructed of any suitable material and preferably so as to insulate the contents of the cabinet. The cover may be provided with suitable packing 8 to produce an air-tight joint between the cover and the body of the cabinet. In the end wall 4 is an inlet 9 arranged for connection with a source of supply of cold water, and in the opposite end wall is an outlet 10 which may be arranged to conduct the water to any suitable place of discharge. The inner ends of the inlet and outlet are preferably bent downwardly to extend below the normal level of water within the cabinet in order that the inlet and outlet shall be sealed against the admission of air. An overflow pipe 11 having its inlet above the normal level of the water in the cabinet, and communicating with an outlet 12 in the bottom of the cabinet, provides an outlet for the water in case the outlet 10 should be clogged with ice, and thus prevents water from entering the cream receptacles.

The cabinet is arranged to receive a main storage receptacle and a smaller primary storage receptacle. The main storage receptacle may be an ordinary cream shipping can 13. Across the bottom of the cabinet extends two metal bars or strips 14 upon which the can 13 may stand. The can 13 is locked in place in the cabinet by means of a plate 15 which is hinged to the end wall 4 at 16 for swinging movement in a vertical plane. The plate 15 is provided with an opening through which cooled cream may be poured into the can 13, said opening being bounded by a downwardly extending annular tapering flange 17 which fits into the mouth of the can 13. The free end of the plate 15 is notched to fit over a projection 18 upon a bracket 19 fixed to the side walls 2 and 3, and the plate 15 may be locked to hold the can 13 in place by means of a locking pin 20 passed through an opening in the projection 18 above the plate 15. The plate 15 when locked by the pin 20, prevents the can 13 from floating when only partially filled with cream.

The primary storage receptacle may consist of a cylindrical can 21 adapted to fit within an opening 22 in the bracket 19. As shown, the upper end of the can 21 has an outwardly extending flange 23 which limits downward movement of the can 21 by contact with the bracket 19. At diametrically opposite points the bracket 19 has notches 24 to admit two diametrically opposite lugs 25 on the can 21. After the can 21 has been lowered into the opening 22, the lugs 25 passing through the notches 24, the can is given a partial rotation to carry the lugs 25 out of register with the notches 24 so that said lugs shall lie beneath a flange 26 which surrounds the opening 22. The can 21 is thereby locked against floating.

27 is a handle for the can 21. If desired, the handle 27 and the lugs 25 may be formed from an integral piece of metal.

Between the cans 13 and 21 is a cross-rod 28 to hold the can 13 against undue swaying during insertion or removal of the can.

In use, the shipping can 13 is placed in the cabinet and locked in position by means of the plate 15 and locking pin 20. The cream that is separated from the morning's milk is placed in the can 21 and the latter is inserted into the cabinet and locked in place. The water flowing through the cabinet cools the cream in the can 21 to a point where excessive growth of bacteria is prevented. In the evening the can 21 is lifted out of the cabinet and the cream in said can is poured into the can 13. The cream from the evening's milk is then placed in the can 21 and said can replaced in the cabinet. The next morning the cooled cream in the can 21 is added to that contained in the can 13. This method is continued until the can 13 is filled with cream to be transported to the city. It will be seen that the cabinet herein disclosed provides means whereby the fresh cream may be thoroughly cooled before it is mixed with the older batch of cream; that all of the cream is kept at a suitably low temperature; that the cream is protected from contamination through the atmosphere; and that the receptacles are supported in such a manner that the cream may be easily deposited and withdrawn.

I claim as my invention:

1. A cream cabinet comprising, in combination, a box having a cover and adapted to contain a suitable cooling means and a can, a member hinged to said box below the cover and having an opening through which cream may be poured into the can, said opening being bounded by a flange extending into the mouth of the can, and means for locking said member in engagement with the mouth of the can.

2. A cream cabinet comprising, in combination, a box having a cover and adapted to contain suitable cooling means, a bracket fixed in said cabinet and having an opening therein, a primary storage receptacle adapted to be inserted in said opening, means for locking the primary receptacle against floating, a main storage receptacle, a plate hinged to the box for movement in a vertical plane, said plate having an opening through which cream may be poured into the main receptacle, means on the lower side of said plate adapted to extend into the mouth of the main receptacle, and means for locking said plate to hold the main receptacle against floating.

In testimony whereof, I hereunto set my hand.

THEODORE L. VALERIUS.

In the presence of—
PAUL KNILAUS,
KENNETH SOLT.